US007000717B2

(12) United States Patent
Ai et al.

(10) Patent No.: US 7,000,717 B2
(45) Date of Patent: Feb. 21, 2006

(54) OUTPUT POWER SPLIT HYBRID ELECTRIC DRIVE SYSTEM

(75) Inventors: Xiaolan Ai, Massillon, OH (US); Terry W. Mohr, Canton, OH (US)

(73) Assignee: The Timken Company, Canton, OH (US)

( * ) Notice: Subject to any disclaimer, the term of this patent is extended or adjusted under 35 U.S.C. 154(b) by 193 days.

(21) Appl. No.: 10/451,123

(22) PCT Filed: Oct. 15, 2002

(86) PCT No.: PCT/US02/32983

§ 371 (c)(1), (2), (4) Date: Jun. 19, 2003

(87) PCT Pub. No.: WO03/035422

PCT Pub. Date: May 1, 2003

(65) Prior Publication Data

US 2004/0050597 A1 Mar. 18, 2004

Related U.S. Application Data

(60) Provisional application No. 60/344,561, filed on Oct. 23, 2001.

(51) Int. Cl.
*B60K 6/04* (2006.01)

(52) U.S. Cl. ........................ 180/65.2; 180/65.7; 477/3; 903/918; 903/942

(58) Field of Classification Search ...... 180/65.2–65.5; 318/139; 477/2–5; 475/5; 322/14–16; 903/910, 903/918, 942

See application file for complete search history.

(56) References Cited

U.S. PATENT DOCUMENTS

| | | | | |
|---|---|---|---|---|
| 1,951,089 A | | 3/1934 | Fielder | |
| 4,270,622 A | * | 6/1981 | Travis | 180/65.4 |
| 5,558,595 A | | 9/1996 | Schmidt et al. | |
| 5,907,191 A | | 5/1999 | Sasaki | |
| 5,947,855 A | | 9/1999 | Weiss | |
| 6,527,074 B1 | * | 3/2003 | Morishita | 180/65.1 |
| 6,886,647 B1 | * | 5/2005 | Gotta | 180/65.1 |

(Continued)

FOREIGN PATENT DOCUMENTS

| | | |
|---|---|---|
| DE | 1113639 | 9/1961 |

(Continued)

*Primary Examiner*—Jeff Restifo
(74) *Attorney, Agent, or Firm*—Polster, Lieder, Woodruff & Lucchesi L.C.

(57) ABSTRACT

A power split hybrid wheel drive system of the present invention comprises a planetary gear train (16) coupled to the output shaft of a driving engine (12). A primary motor or generator (18) is coupled to an output shaft of the planetary gear train (16) for receiving power therefrom, and a secondary motor or generator (30, 32) is associated with each driven vehicle wheel (14) to provide an electrical power pathway. A mechanical differential gear train (20) is coupled between the output shaft of the planetary gear train (16) and each driven vehicle wheel; (14) to provide a mechanical power pathway, while a mechanical clutch (22) and brake system (24) is configured to regulate the mechanical power routed to the differential gear train (20). A control system (48) is included to regulate the flow of electrical power between the primary motor (18) and secondary motors or generators (30, 32).

15 Claims, 17 Drawing Sheets

U.S. PATENT DOCUMENTS

| | | | | |
|---|---|---|---|---|
| 2003/0205422 | A1 * | 11/2003 | Morrow et al. | 180/65.2 |
| 2004/0050598 | A1 * | 3/2004 | Saito et al. | 180/65.2 |
| 2004/0060752 | A1 * | 4/2004 | Oshida et al. | 180/65.2 |
| 2004/0104699 | A1 * | 6/2004 | Nishikawa et al. | 318/376 |
| 2005/0009665 | A1 * | 1/2005 | Cho | 477/5 |

FOREIGN PATENT DOCUMENTS

| | | | |
|---|---|---|---|
| WO | 9533630 | | 12/1995 |
| WO | 9845928 | | 10/1998 |
| WO | 0176902 | | 10/2001 |
| WO | WO 03/035422 | * | 5/2003 |

* cited by examiner 14
14
14
14
14
14
14
14
201A
200A
200B
201B
12
16
38
17
40
42
24
10
22
18
50
104
48
102
34
32
36
20
30
106B
108B
108A
106A

OUTPUT POWER SPLIT HYBRID ELECTRIC DRIVE SYSTEM

CROSS REFERENCE TO RELATED APPLICATIONS

This application claims priority to U.S. Provisional Application Ser. No. 60/344,561 filed on Oct. 23, 2001, herein incorporated by reference.

TECHNICAL FIELD

The present invention relates generally to a vehicle wheel drive system, and in particular to a vehicle wheel drive system having a power transmission providing an infinitely variable speed ratio as well as independent speed and torque control for each of driven vehicle wheel.

BACKGROUND ART

A typical vehicle features a driving engine, a power transmission system, and a final drive with two output differential axles connected to one or more sets of driven wheels. A conventional power transmission system includes a single input shaft and a single output shaft, and usually operates with stepwise speed ratio changes defined by the mechanical gear ratios contained therein. The power from the engine is delivered through the input shaft to the power transmission system, and then through the output shaft to the final drive. The final drive distributes the driving power through each differential axle to each driven wheel on an equal-torque basis. To achieve a desired vehicle speed, the engine speed is varied between each speed ratio change in the power transmission system. The wide variation in driving engine speed reduces fuel efficiency and increases exhaust emissions.

When road surface variations at each wheel produce different coefficients of friction, the lower wheel driving torque of the two wheels limits the effective driving torque, which is twice the lowest wheel torque. The application of torque in excess of the lowest wheel torque level results in spinning of the vehicle wheel.

Infinitely variable power transmission (IVT) systems and continuously variable power transmission (CVT) systems have been developed to provide continuous speed ratio changes, thereby improving vehicle fuel efficiency, driving comfort, and reducing vehicle exhaust emissions by permitting the vehicle engine to maintain a relatively constant speed. Both IVT and CVT systems are capable of providing continuous speed ratio change between the driving engine and driven wheels, however, the output speed of an IVT can be reduced to zero and even reversed, while the output speed of a CVT cannot. This IVT capability is an important feature, because devices utilized to assist in vehicle launch (i.e. transition from a stopped state to a moving state), such as torque converters or clutches, can be eliminated.

There are two types of IVT systems: hydro-mechanical IVT systems and electro-mechanical IVT systems. Although a wide variety of configurations are possible, the vast majority of IVT systems operate on a power-split concept. They feature a single input for receiving power from the driving engine and a single output shaft for delivering the power to the final drive and associated driven wheels. They further employ some form of power splitting devices, allowing the power at the input shaft to be converted partially or fully converted into non-mechanical forms such as hydraulic power or electric power, and then reconverted back to mechanical forms before leaving at the output shaft.

Hydro-mechanical IVT systems are known in the art to have several drawbacks. First, hydraulic drives are not suitable for high-speed operation. This, to a large degree, limits hydro-mechanical IVT systems to non-automotive applications. Secondly, hydrostatic pump or motors utilized in hydro-mechanical IVT systems are very noisy when operated at pressures greater than 5,000 PSI. Finally, hydrostatic pumps and motors are not conducive to shaft-concentric and compact transmission designs. In addition, the positions of the hydrostatic units such as pumps or motors within the IVT system may be subjected to various mechanical constraints.

The electro-mechanical IVT systems overcome several of the aforementioned problems. Recent developments in electro mechanical systems have demonstrated, among other features, advantages efficiency, controllability, and system flexibility. Furthermore, with the addition of energy storage systems, electro-mechanical IVT systems can also function as power regulators, buffering output power fluctuations, thereby providing vehicle drive system hybridization options U.S. Pat. Nos. 5,907,191, 5,914,575, 5,991,683 and 5,920,160 each assigned to Toyota Jidosha Kabushiki Kaisha of Toyota, Japan disclose a single-node electro-mechanical power split transmission known in the industry as the Toyota Hybrid System (THS). The THS employs a single planetary gear system comprising a sun gear, a ring gear, and a planetary carrier as a power splitting device, such that the THS device is categorized as an output power split system. In the THS, the planetary carrier is connected to the input shaft to receive power from the driving engine. The associated sun gear is connected to an electric motor/generator. The ring gear is connected to a second motor or generator and to the output shaft that delivers the power to the driving wheels through a differential. The THS has an adequate speed ratio range for compact passenger car applications. Within the transmission speed range, there is a point where zero power passes through the electric motor path. Power is transmitted mechanically from the input shaft to the output shaft. This point is defined as the node point at which the transmission yields the maximum efficiency.

While the THS is suitable for providing infinitely variable speed and some level of vehicle hybridization, the output power to each driving wheel cannot be individually controlled. When driving in uneven terrain having varied surface coefficients of friction, it is highly desirable to match the driving power supplied to each individual driven wheel to different driving requirements. Driving the driven wheels at different speeds and individually controlling the driving torque when traveling on a slippery surface or around a curve has the distinct advantages of avoiding vehicle deformation, reducing tire wear, attaining improved traction, and enhancing vehicle dynamic stability.

U.S. Pat. No. 5,947,855 assigned to Deere & Company of Moline, Ill. discloses a vehicle hybrid wheel drive system. The hybrid drive system includes a pair of summing gears, each having an output shaft coupled to a respective driven wheel. Each summing gear also features a first input coupled to a drive shaft and a second input coupled to a respective electric motor. The drive shafts in both summing gears are operatively connected to a common shaft that in turn connects to driving internal combustion engine and an electric generator. This system has a single node point where zero power passes through the electric motor path, and since the torque splitting takes place at the power input, this system is classified as an input power split system. An input power split system is most suited for high-speed operation beyond the node point because at slow vehicle speed operation, below the node point, excessive internal power circulation takes place within the power transmission system. The power that passes through the electric path can become several times greater than the mechanical transmission power. This significantly reduces the efficiency, thereby offsetting the benefit otherwise produced by the IVT system.

In addition, the mechanical system disclosed in U.S. Pat. No. 5,947,855 is complex, having two sets of identical Ravigneaux compound planetary trains. This not only affects the compactness of the drive system, limiting the application scope, but also increases the cost.

Accordingly, it would be highly desirable to provide a simple power split hybrid wheel drive system which is capable of providing an infinitely variable speed ratio and of controlling both torque and power application to multiple driven wheels of a vehicle, so as to provide for improved vehicle fuel efficiency, reduced driving engine emissions, and enhanced vehicle dynamic stability.

SUMMARY OF THE INVENTION

An objective of this invention is to provide a simple power split hybrid wheel drive system capable of providing individual infinitely variable speed and torque, as well as drive power control to multiple driven wheels on a vehicle, and which is capable of maintaining a driving engine in a high fuel efficiency operational state over the entire vehicle driving range.

Briefly stated, a power split hybrid wheel drive system of the present invention comprises: (a) a planetary gear train coupled to the output shaft of a driving engine; (b) a primary motor or generator coupled to a shaft of the planetary gear train; (c) a secondary motor or generator associated with at least one driven vehicle wheel; (d) a mechanical differential gear train coupled between the output shaft of the planetary gear train and driven vehicle wheels; a mechanical clutch and brake system to regulate the power routed to the differential gear train; and (d) a control system to regulate the flow of electrical power to and from the primary and secondary motors or generators.

In an alternate embodiment, the wheel drive system further comprises: (e) an energy storage system coupled to the control system; (f) a direction selection gear train associated with the mechanical differential gear train; (g) two or more additional secondary motors or generators coupled to additional driven vehicle wheels; and (h) one or more conventional speed reduction units.

The hybrid wheel drive system of the present invention provides two power paths for power transmission. One is a mechanical path, from the driving engine through the planetary gear train to the mechanical differential drive and to the driven wheels. The other is an electric path in which the input mechanical power from the driving engine is converted to electric power by one or more primary motors or generators and then regulated and transmitted through a control system to secondary motors or generator. The latter then converts the electric power back to mechanical power, combining it with the power from the mechanical path at the output or driven wheels.

The hybrid wheel drive system of the present invention provides infinite speed ratio change, allowing the speed of vehicle to vary from zero to maximum rated speed with high efficiency. Further, the hybrid wheel drive system of the present invention provides at least one point where no power is passing through the electric path, and all power transmitted from the driving engine to the driven wheels passes through the mechanical path for maximum efficiency.

The drive system of the present invention permits individual control to each of the vehicles' driven wheels, is capable of providing traction control, and of providing active differential function to the vehicle. Furthermore, the wheels on the two sides of the vehicle can be driven in opposite directions if desired for special steering capability.

With optional direction selecting devices and clutches, the drive system can have the same drive range in forward and reverse operations.

The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
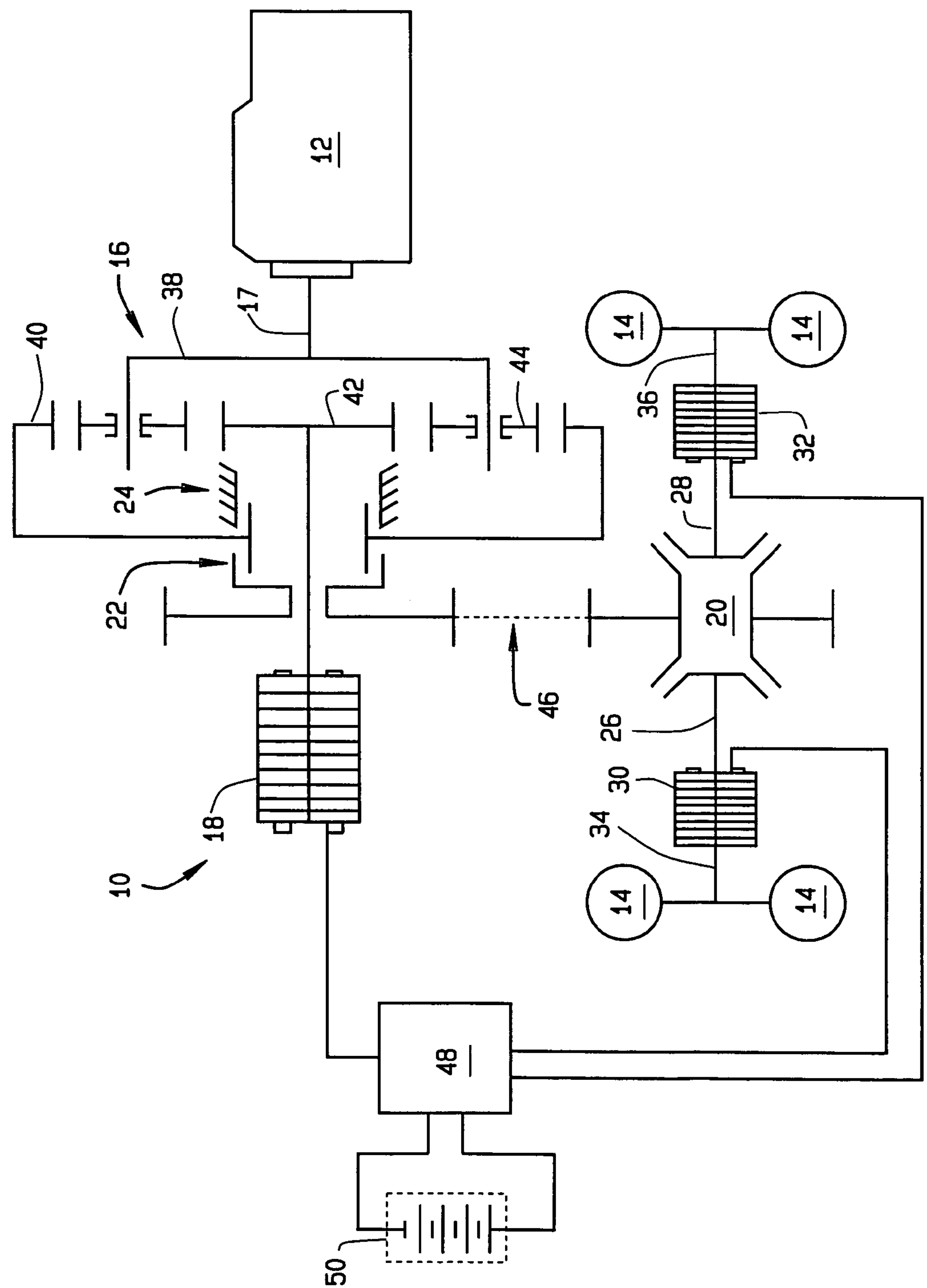
FIG. 1 is a schematic diagram of the preferred embodiment of the drive system of the present invention.

Referring to FIG. 1, there is shown a first embodiment of the drive system 10 of the present invention, coupled between a driving engine 12 and a set of driven wheels 14. The drive system 10 comprises planetary gear train, indicated generally at 16, driven by an output shaft 17 from the driving engine 12. Output from the planetary gear train 16 is split between a primary electric motor (generator) 18 and a mechanical differential gearbox 20. Output from the planetary gear train 16 is regulated by a mechanical clutch 22 and a brake system 24.

Output from the mechanical differential gearbox 20 is directed along a pair of intermediate output shafts 26 and 28, to secondary electric motors (generators) 30 and 32. The output shafts 26 and 28 are coupled to the secondary electric motors (generators) 30 and 32 either directly or via one or more conventional gear trains (not shown). Each secondary electric motor 30, and 32 drives an associated driven wheel 14 through an associated wheel output shaft 34 or 36. The output shafts 26 and 28 are also mechanically coupled to wheel output shafts 34 and 36, respectively. The driven wheels 14 are each coupled to the associated wheel output shafts 34 or 36 either directly of via a conventional reduction gear train (not shown).

It should be noted that in the context of this invention, the term "wheel" is not limited to a pneumatic tire and rim combination as found on conventional automotive vehicles, but will be understood by those of ordinary skill in the field to include sprocket drives and tracked wheel system. Similarly, the term "motor" as used herein, is intended to describe an electrical device which is capable of converting received electrical power into mechanical power, i.e. having a motor state, and is further capable of converting received mechanical power into electrical power, i.e. having a generator state.

It should further be noted that while the present invention is described in the context of an electrical-mechanical drive system 10, some of the principles, arrangements, or drive system configurations disclosed herein are equally apply to hydro-mechanical drive systems.

Returning to FIG. 1, the planetary train 16, which can be a simple planetary gear set or a compound planetary gear set, such as Simpson gear set or Ravigneaux gear set, has at least three concentric rotation members 38, 40, and 42 referred to as the planet carrier, ring gear, and sun gear, respectively. A set of planetary gears 44 meshes with the second rotation member (ring gear 40) and the third rotation member (sun gear) 42 in a conventional manner for a planetary train.

The first rotation member (planet carrier) 38 is operatively connected to the engine output shaft 17 for receiving power from the driving engine 12. The connection between the first member 38 and the engine output shaft 17 may be direct, or may be through a conventional gear train, one or more conventional clutches, or one or more conventional torque converters (not shown).

The second concentric rotation member (ring gear) 40 of the planetary train 16 is operatively connected to the mechanical differential gearbox 20 by an input shaft 46 for delivering power to the mechanical differential gearbox 20. The connection between the second concentric rotation member 40 and the input shaft 46 may be directly through the mechanical clutch 22, or may be through one or more conventional clutches in conjunction with gear trains, belts, or chains (not shown).

The third concentric rotation member (sun gear) 42 of the planetary train 16 is operatively coupled to the primary electric motor 18, either directly or through one or more conventional gear trains (not shown).

The primary electric motor 18 and each of the secondary electric motors 30, 32 are coupled to a control unit 48. The control unit 48 regulates the flow of electrical power received from or delivered to the primary electric motor 18 and each of the secondary electric motors 30 and 32, and controls the operational speed of each motor 18, 30, and 32. An electrical energy storage unit 50 is further coupled to the control unit 48, and is configured to store or dispense electrical power as directed by the control unit 48.

During operation of a vehicle 100 equipped with the wheel drive system 10 of the present invention, multiple operational modes are provided, including neutral, parking, engine start, forward, and reverse operational modes.

In the neutral mode of operation, the mechanical clutch 22 is disengaged and the secondary motor 30 and 32 are switched off.

In the parking mode of operation, the mechanical clutch 22 and the brake system 24 are engaged. The primary motor 18 is either in a "free wheeling" state, switched off, or in a charging state. Secondary motor 30 and 32 are switched off.

In the engine start mode of operation, mechanical clutch 22 is disengaged, and the brake system 24 is engaged. The control unit 48 directs electric power from the energy storage unit 50 to the primary motor 18, which is utilized to start the driving engine 12 by rotating the output shaft 17 through the planetary gear train 16.

In the forward operational mode, the vehicle may be either stationary (i.e. idling) or in motion. When the vehicle is stationary, the primary motor 18 is in a freewheeling state, providing substantially zero torque as required to balance the driving engine 12. Each of the secondary motors 30 and 32 are stationary, but are ready to provide initial launch torque to the associated driven wheels 14.

Figure 2:
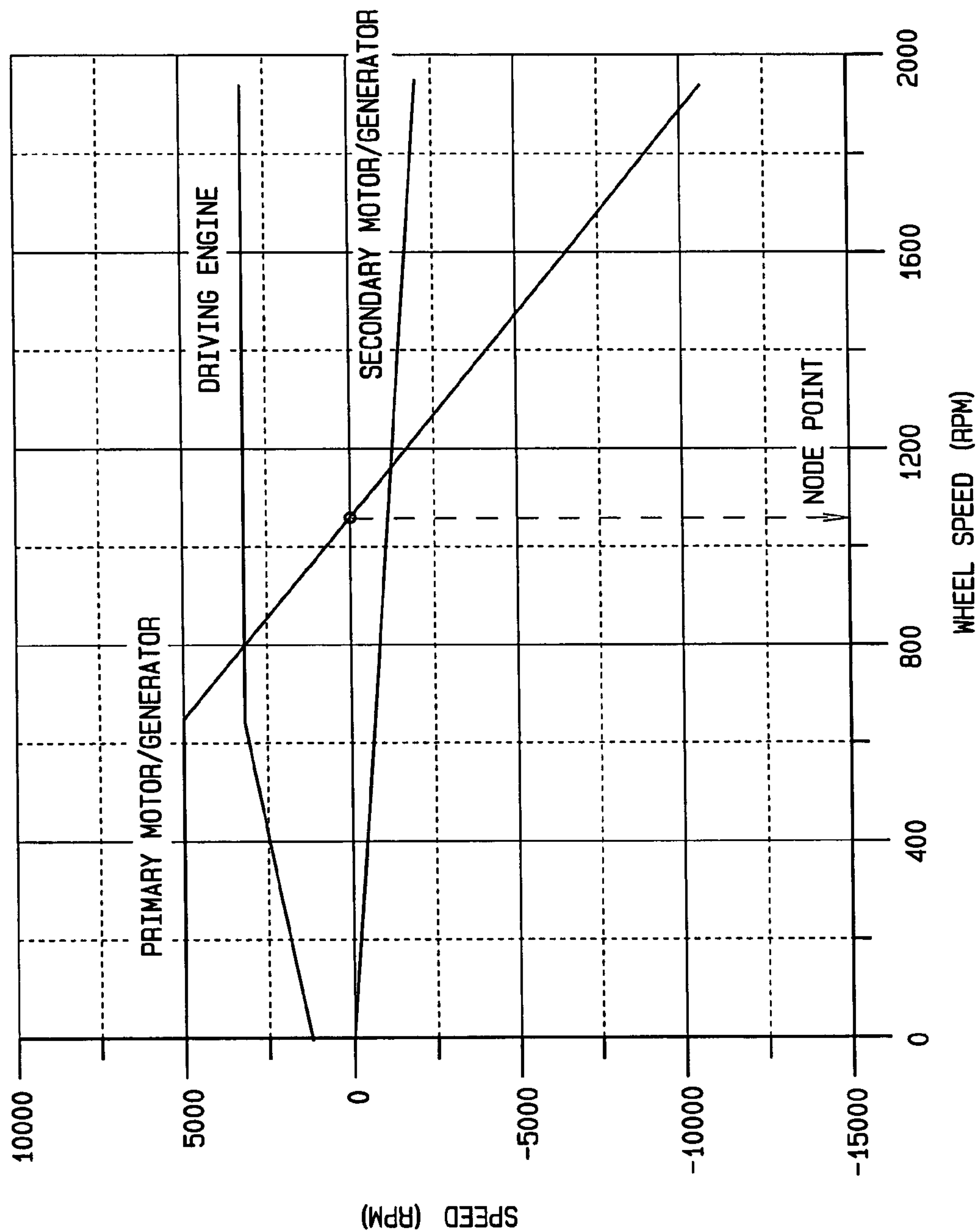
FIG. 2 is a graphical representation of engine, motor, and generator speed versus wheel speed for the preferred embodiment of FIG. 1 under uniform traction conditions.
Figure 3:
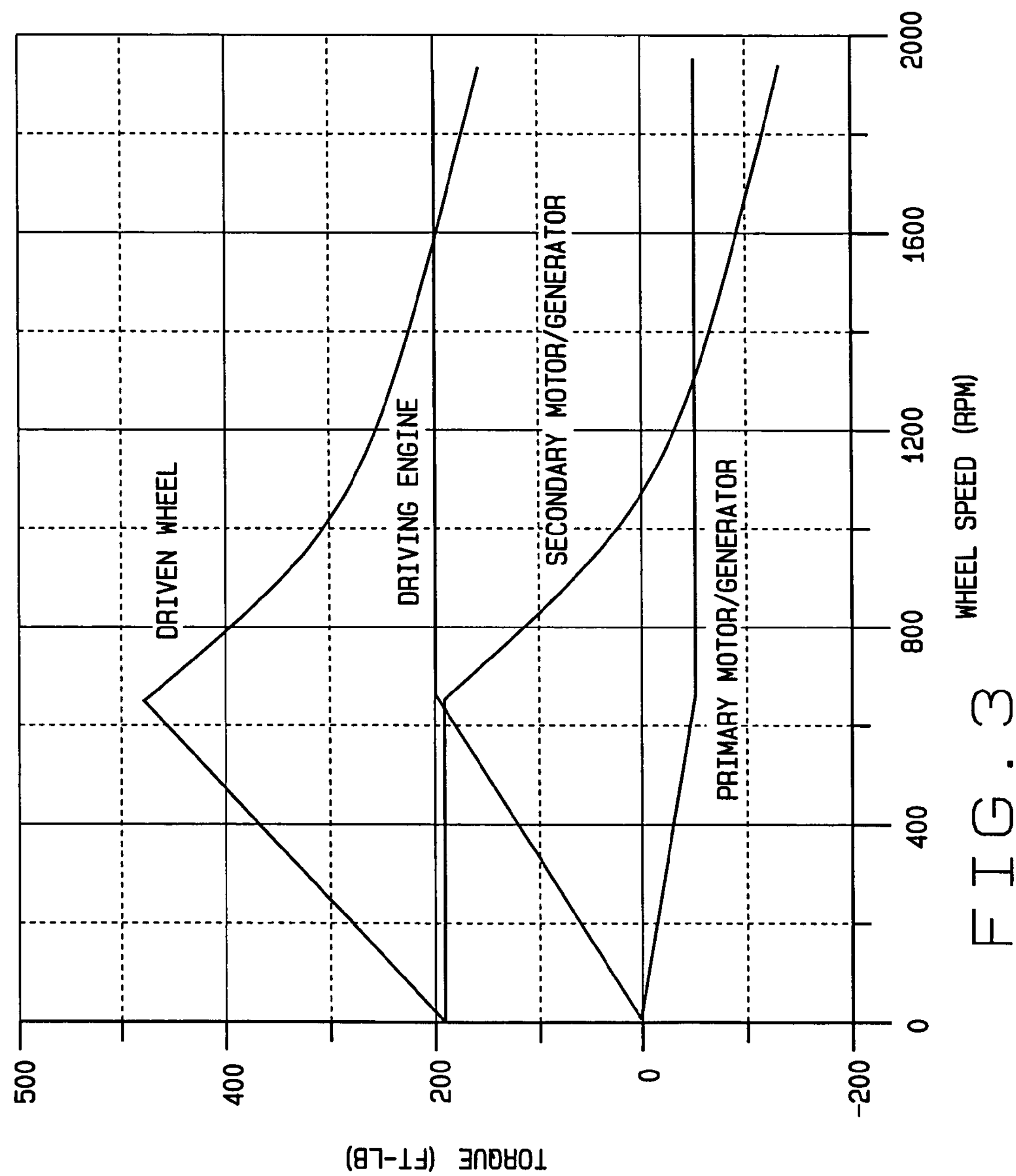
FIG. 3 is a graphical representation of engine, motor, and generator torque versus wheel speed for the preferred embodiment of FIG. 1 under uniform traction conditions.
Figure 4:
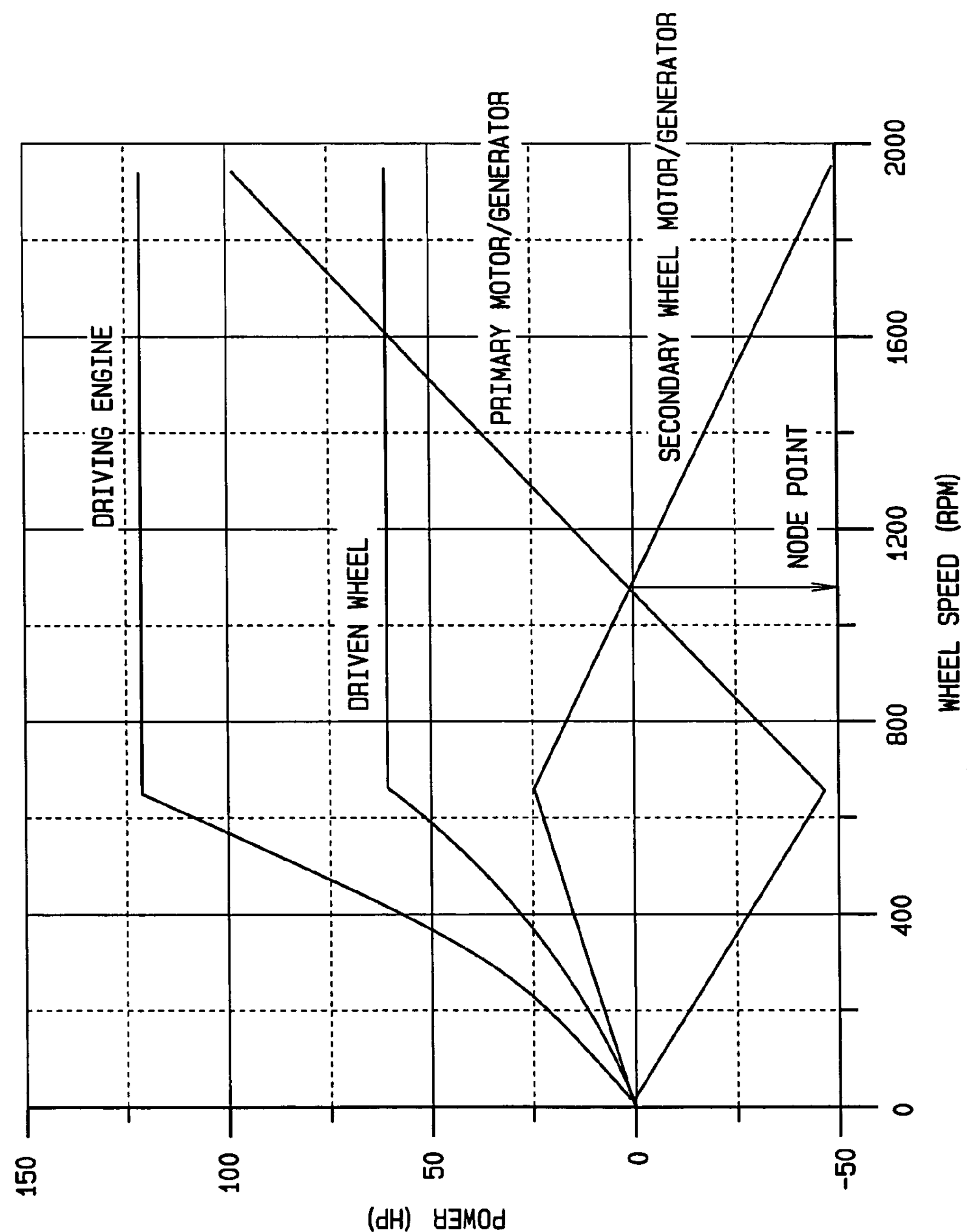
FIG. 4 is a graphical representation of engine, motor, and generator power versus wheel speed for the preferred embodiment of FIG. 1 under uniform traction conditions.

Turning to the graphical representations of speed, torque, and power shown in FIGS. 2, 3, and 4, when the control unit 48 is instructed by an operator to move the vehicle forward, the control unit 48 signals the primary motor 18 to increases the output torque required to balance the increasing torque of the driving engine 12. Consequently, the primary motor 18 functions as an electrical generator, providing electric power to each of the secondary motors 30 and 32 through the interconnected control unit 48. Each of the secondary motors 30 and 32 operators to convert the received electric power to mechanical power, driving each associated driven wheel 14 together with mechanical power provided by driving engine 12 through planetary train 16 to each of the shafts 26 and 28. During this period, the driving engine 12 increases output torque till a maximum rated power level is reached, at which point the operational speed of the primary motor 18 begins to decrease, as is seen in FIG. 2.

The operational speed of the primary motor 18 continues to decrease as the forward speed of the vehicle 100 increases. The operation speed of the primary motor 18 eventually reaches zero, at which point the primary motor 18 ceases to generate electrical power, as seen in FIG. 4. As shown in FIGS. 2 and 4, this is considered a node point at which the drive system 10 of the present invention achieves maximum power transmission efficiency. Continued operation beyond the node point results in the primary motor 18 reversing rotational direction and increasing operational speed. The reversed rotational direction of the primary motor 18 results in the primary motor 18 receiving electric power generated by each of the secondary motors 30 and 32.

The plots shown in FIGS. 2, 3, and 4 assume the vehicle 100 is traveling straight in the forward direction and that each of the driven wheels 14 experience equal traction forces with the road surfaces. Further, it is assumed that the driving engine 12 is under full load and reaches a desired maximum operational speed.

When road surface conditions change, the maximum available traction experienced by each driven wheels 14 may vary. It has been observed that matching the individual drive torque applied to each driven wheel 14 with the road surface condition, as represented by the traction experienced by each driven wheel 14, can effectively prevent the driven wheels 14 from slipping. Individual drive torque is matched to the road surface conditions by redirecting power from a slipping driven wheel 14 to a non-slipping driven wheel 14, thus enhancing overall drive power.

Figure 5:
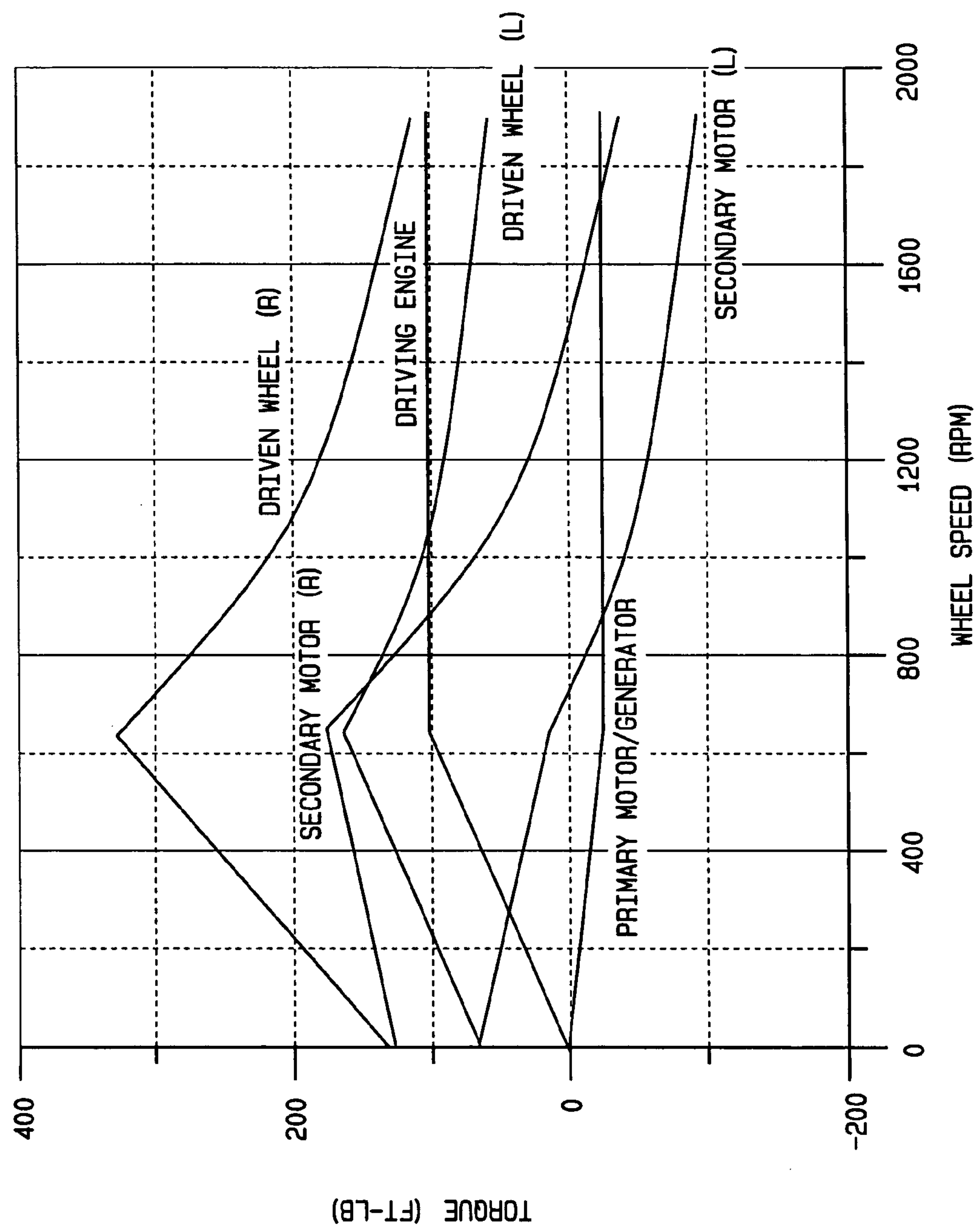
FIG. 5 is a graphical representation of engine, motor, and generator torque versus wheel speed for the preferred embodiment of FIG. 1 under uneven traction conditions.
Figure 6:
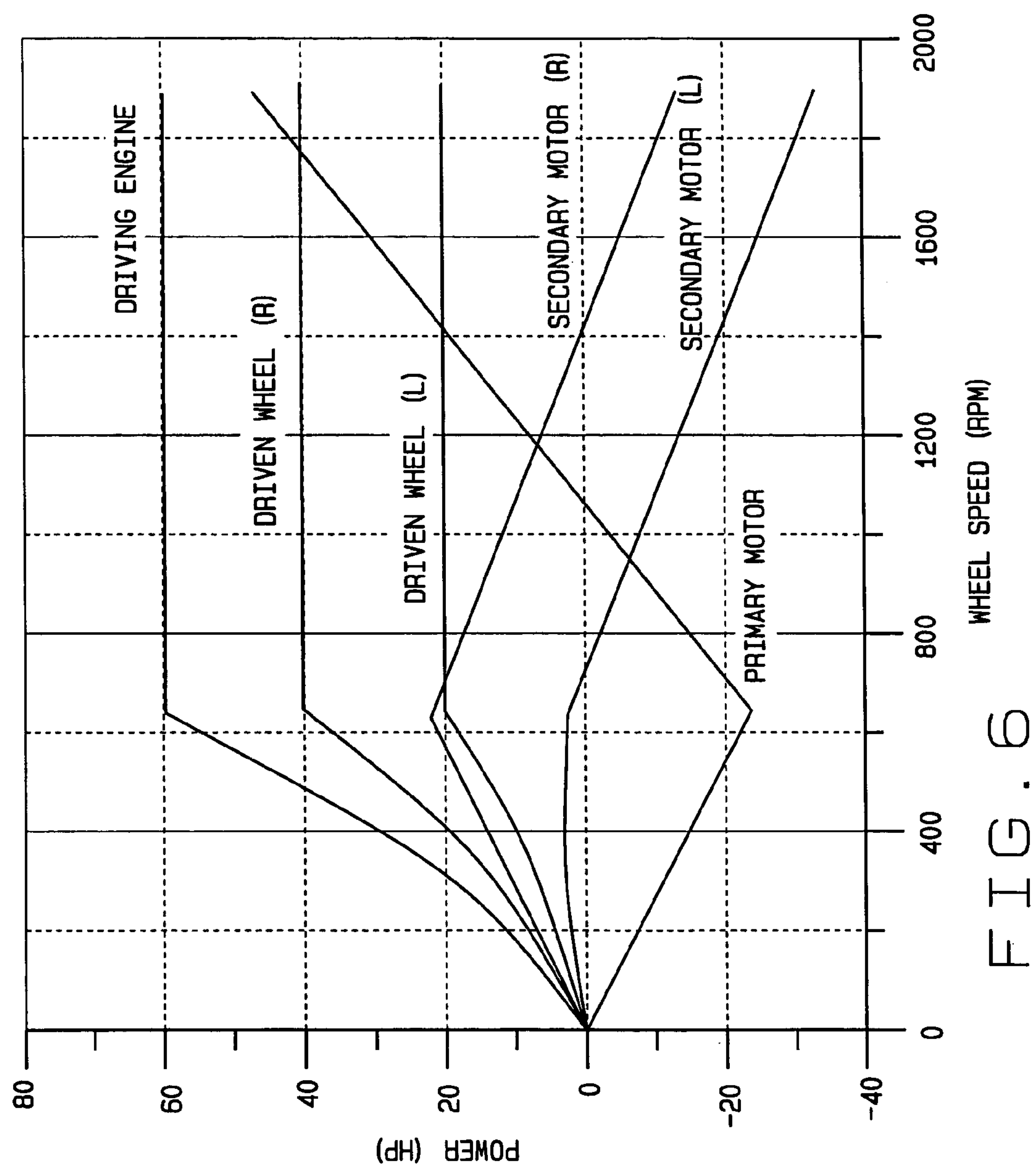
FIG. 6 is a graphical representation of engine, motor, and generator power versus wheel speed for the preferred embodiment of FIG. 1 under uneven traction conditions.

Under uniform road surface conditions, it is often desirable to vary the driving torque supplied to each of the driven wheels 14 to enhance the dynamic performance of the vehicle 100, for example, when turning FIGS. 5 and 6 plot torque and power curves under forward operational conditions with the driving engine 12 under one-half load and operating at maximum operational speed for a vehicle 100, assuming the driven wheel 14 on the one side receives twice as much of the driving torque as the driven wheel 14 on the opposite side of the vehicle 100.

In the reverse mode of operation, the drive system 10 of the present invention operates as a series hybrid-drive to avoid internal power circulation. In a series hybrid-drive, all power supplied to the driven wheels 14 is provided by the secondary motors. The mechanical clutch 22 is disengaged, and the braking system 24 engaged. The primary motor 18 operation is controlled by the control system 48 to operate in a generator state, converting power received from the driving engine 12 through the planetary train 16 into electrical power. The generated electrical power is routed through the control system 48 to the secondary motors 30, 32 where it is converted to mechanical power, driving the driven wheels 14 of the vehicle 100 in the reverse direction.

Figure 7:
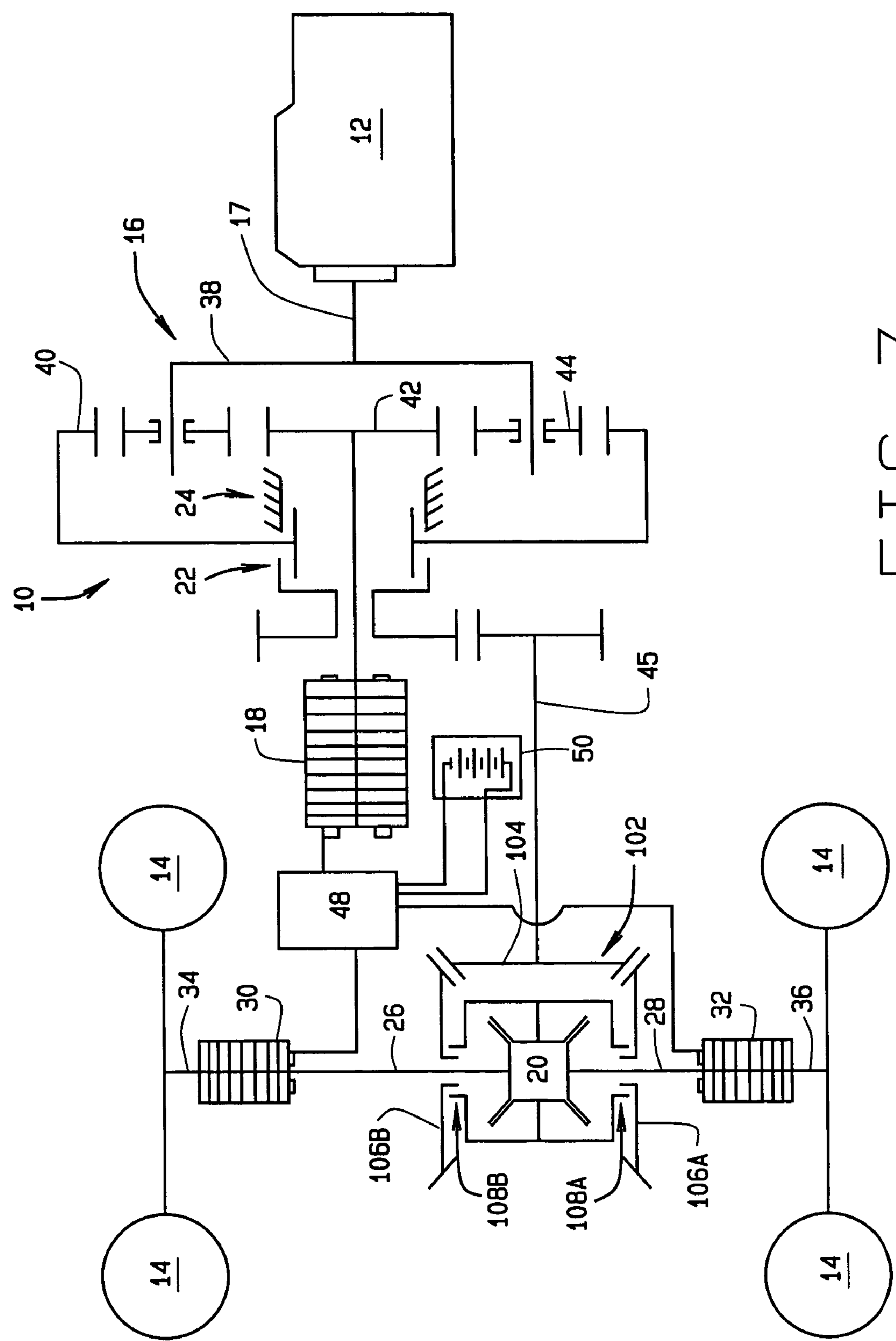
FIG. 7 is a schematic diagram of a first alternate embodiment of the drive system of the present invention including a drive direction selecting device.

Turning to FIG. 7, a first alternate embodiment of the drive system 10 of the present invention is shown. A direction selecting device 102 is coupled to an input shaft 45 of the mechanical differential gearbox 20, facilitating a parallel hybrid-drive configuration of the drive system 10 during both forward and reverse modes of operation. In a parallel hybrid-drive configuration, each driven wheel 14 receives power from both the mechanical power pathway and from the electrical power pathway. The direction selecting device 102 consists of a pinion gear 104, a pair of bevel gears 106A and 106B meshed with the pinion gear 104, and a pair of clutches 108A and 108B.

To operate in the forward mode, one of the clutches 108A, 108B is engaged, and the other is disengaged. To operate in the reverse mode, the clutches 108A and 108B reverse their respective engagement status. Changes in between the vehicle forward and reverse operational modes preferably occur under zero speed and zero torque conditions such that the transition occurs smoothly. Using the direction selection device 102, operational characteristics of the drive system 10 in the reverse mode of operation are a mirror image of the operational characteristics of the drive system 10 in the forward mode of operation.

Figure 8:
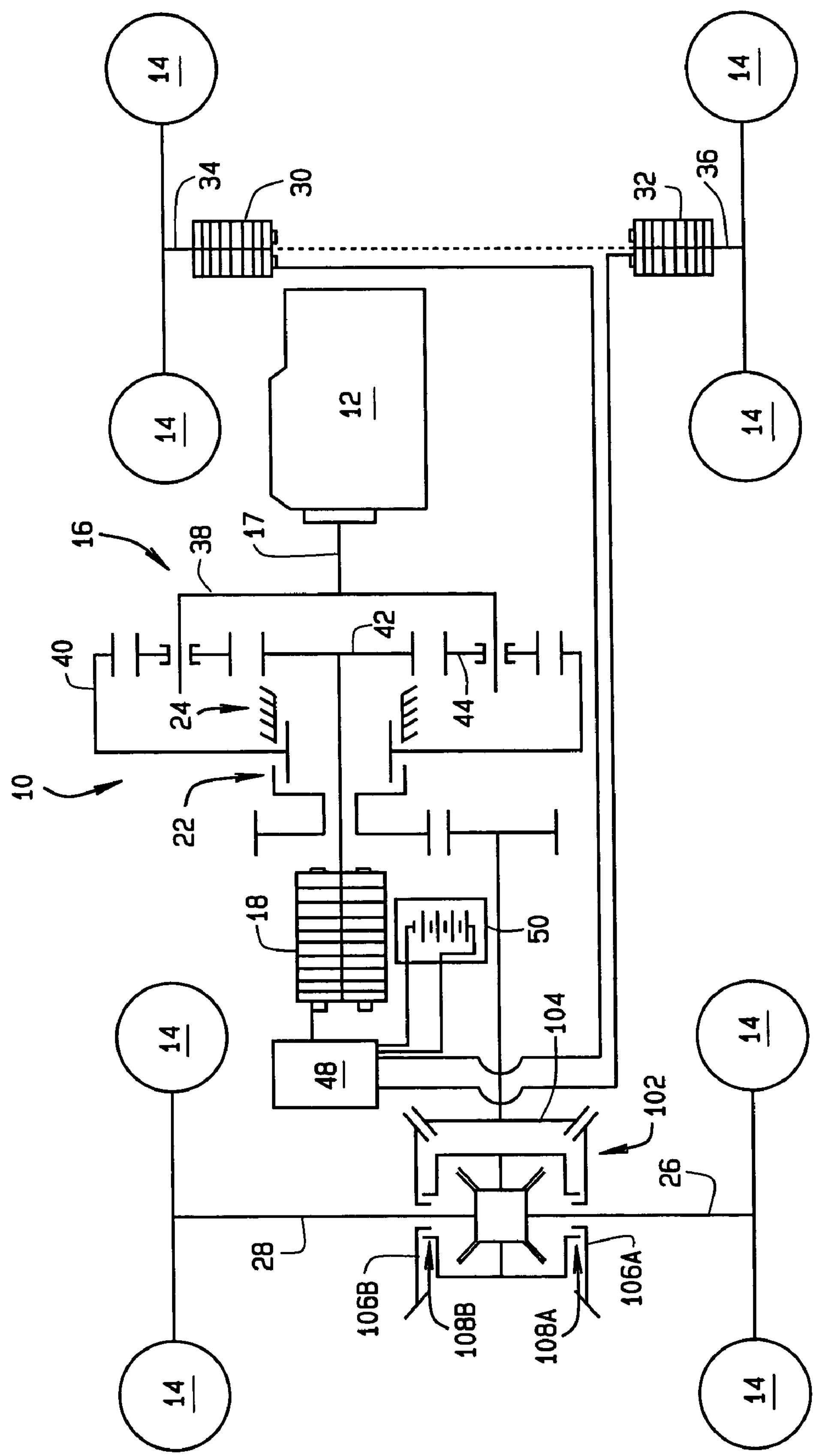
FIG. 8 is a schematic diagram of a second alternate embodiment of the drive system of the present invention.

FIG. 8 through FIG. 13 each illustrate alternate embodiments of the drive system 10 of the present invention. In FIG. 8, each of the secondary motors 30, 32 are coupled to a set of driven wheels 14 which are not mechanically coupled to the mechanical differential gearbox 20, thereby providing a four-wheel drive system.

Figure 9:
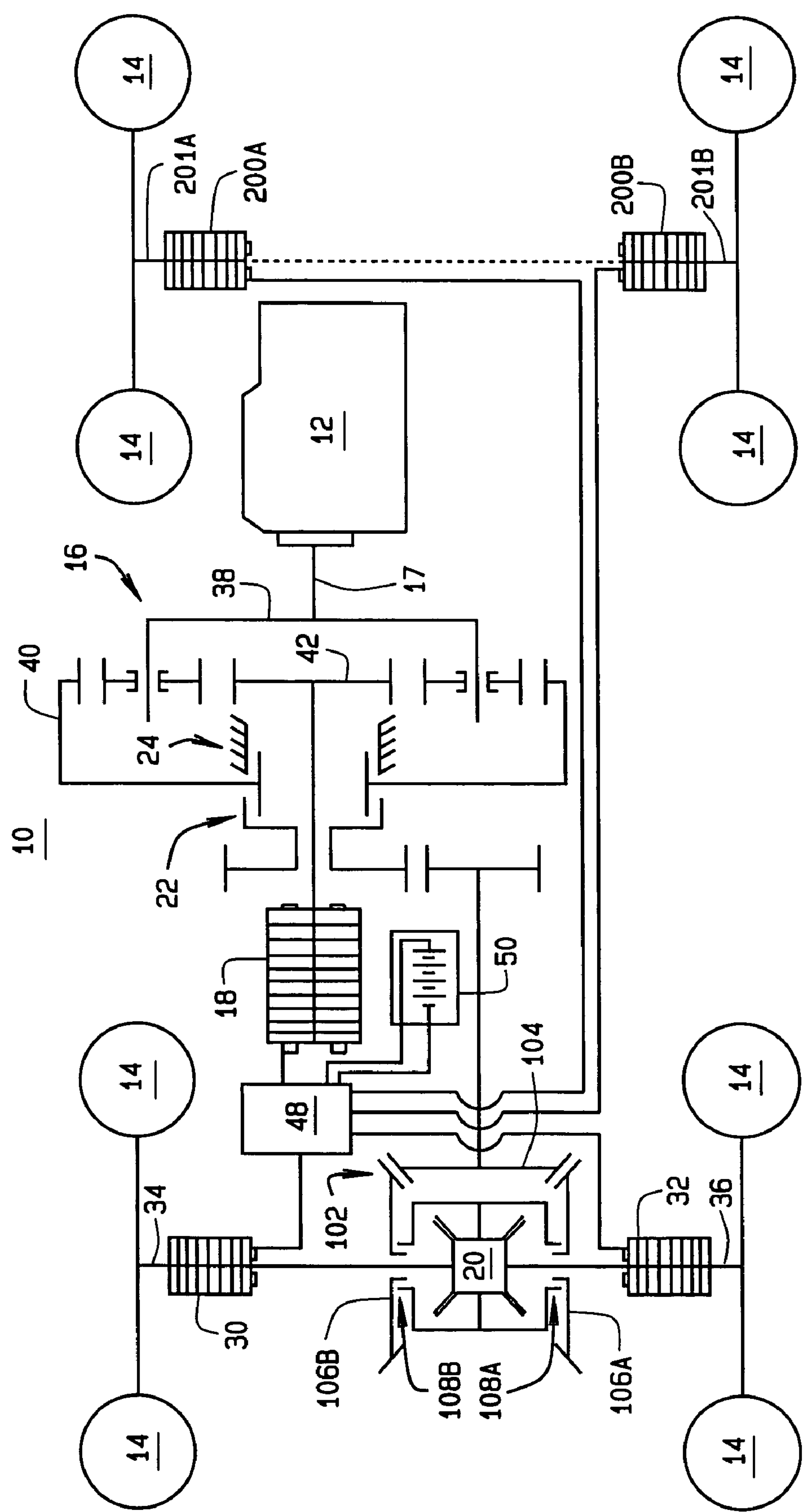
FIG. 9 is a schematic diagram of a third alternate embodiment of the drive system of the present invention.
Figure 10A:
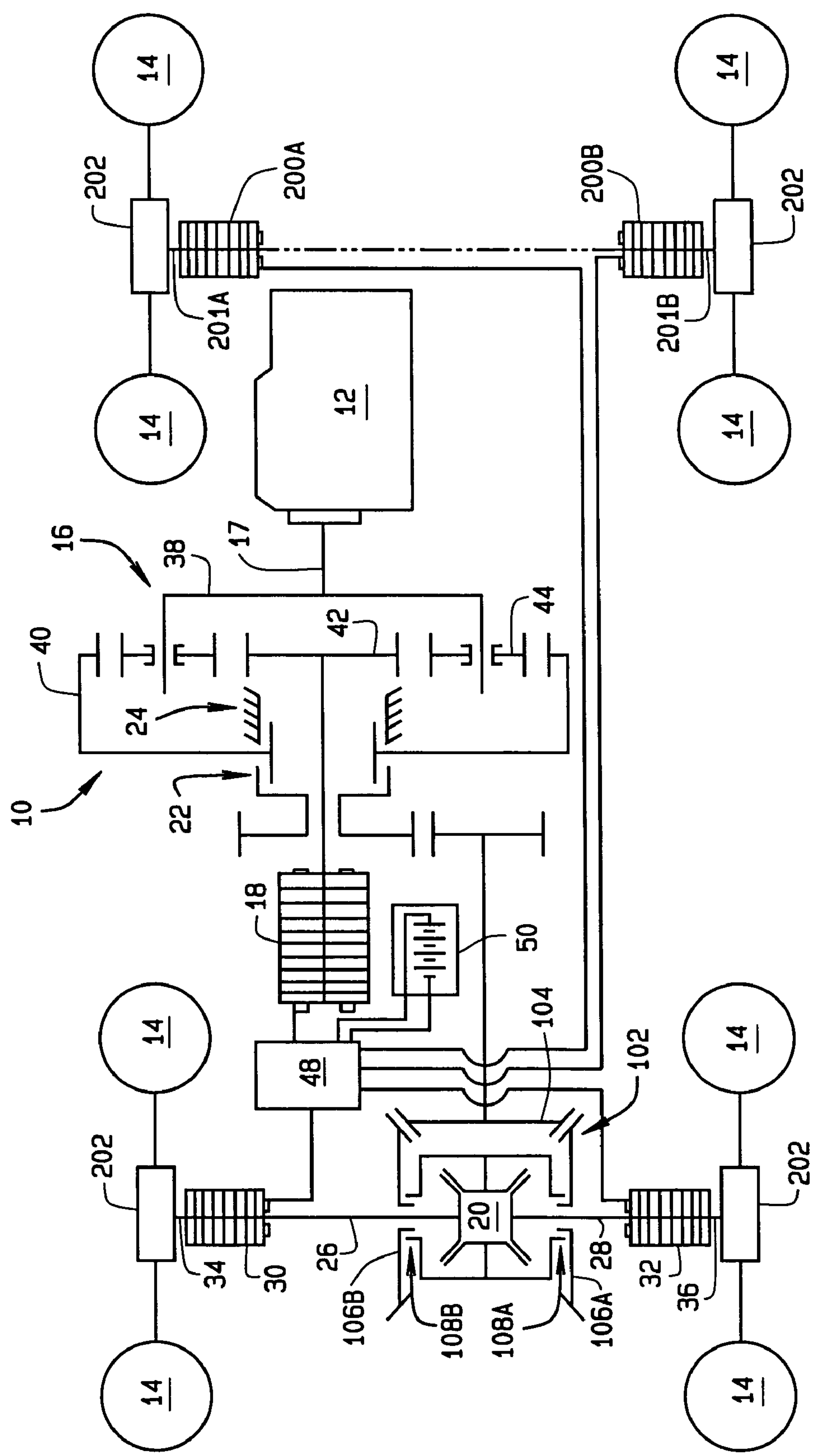
FIG. 10A is a schematic diagram of a fourth alternate embodiment of the drive system of the present invention.
Figure 10B:
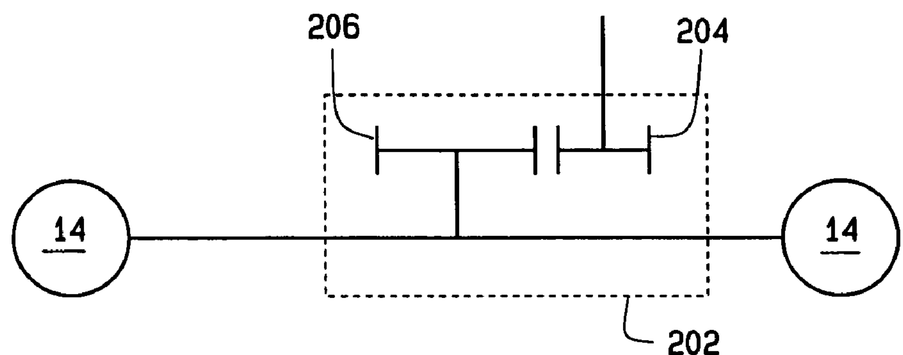
FIG. 10B is a sectional view of a first alternate embodiment speed reducer utilized in FIG. 10A.
Figure 10C:
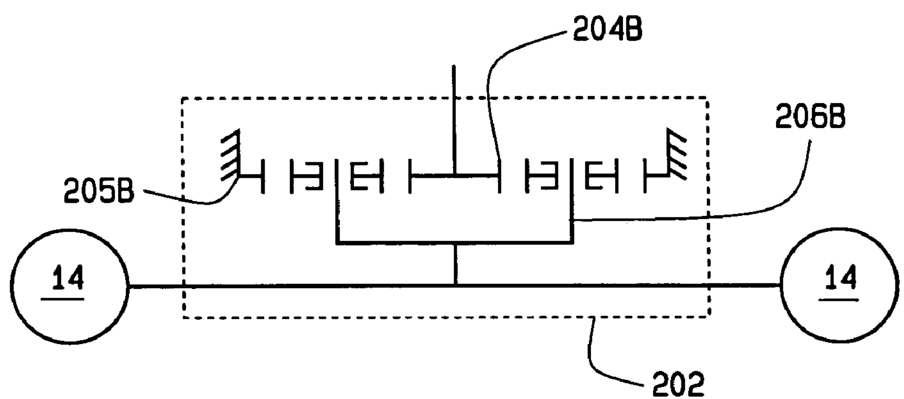
FIG. 10C is a sectional view of a second alternate embodiment speed reducer utilized in FIG. 10A.
Figure 10D:
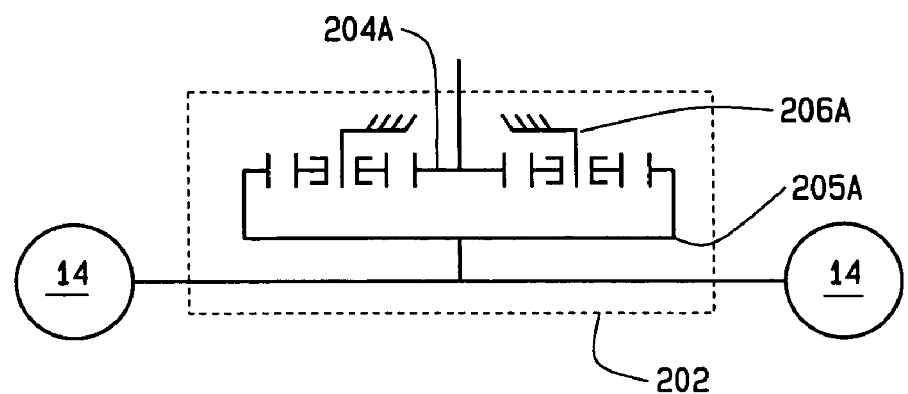
FIG. 10D is a sectional view of a third alternate embodiment speed reducer utilized in FIG. 10A.

In FIG. 9, two additional secondary motors 200A and 200B are employed in the drive system 10. These secondary motors 200A and 200B are coupled to a set of driven wheels 14 through associated wheel output shafts 201A and 201B, which are not mechanically coupled to the mechanical differential gearbox 20, thereby providing a four-wheel drive system. Each of the secondary motors 30, 32, 200A and 200B are interconnected to each other and to the energy storage system 50 though the control unit 48.

Figure 11:
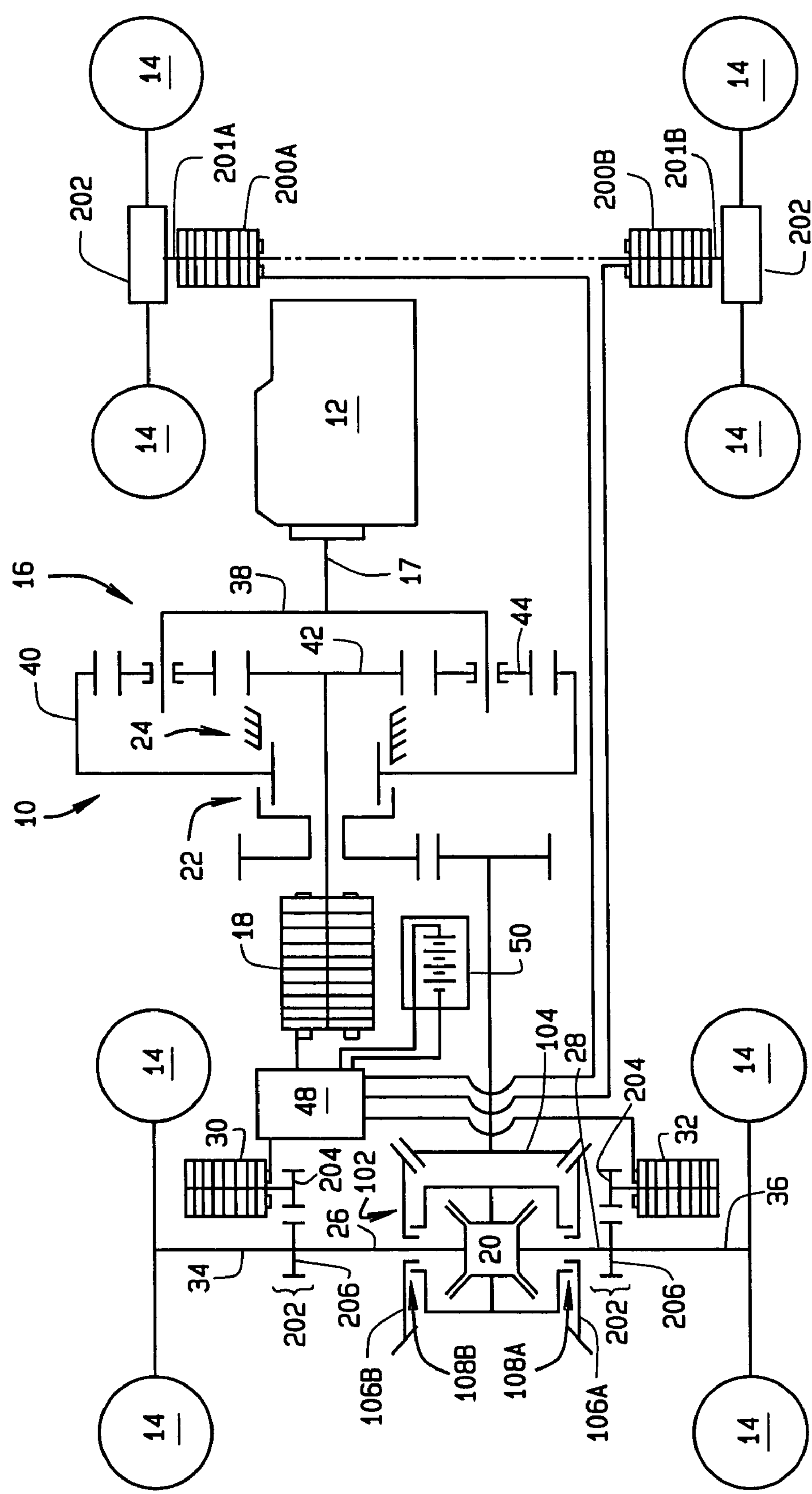
FIG. 11 is a schematic diagram of a fifth alternate embodiment of the drive system of the present invention.
Figure 12:
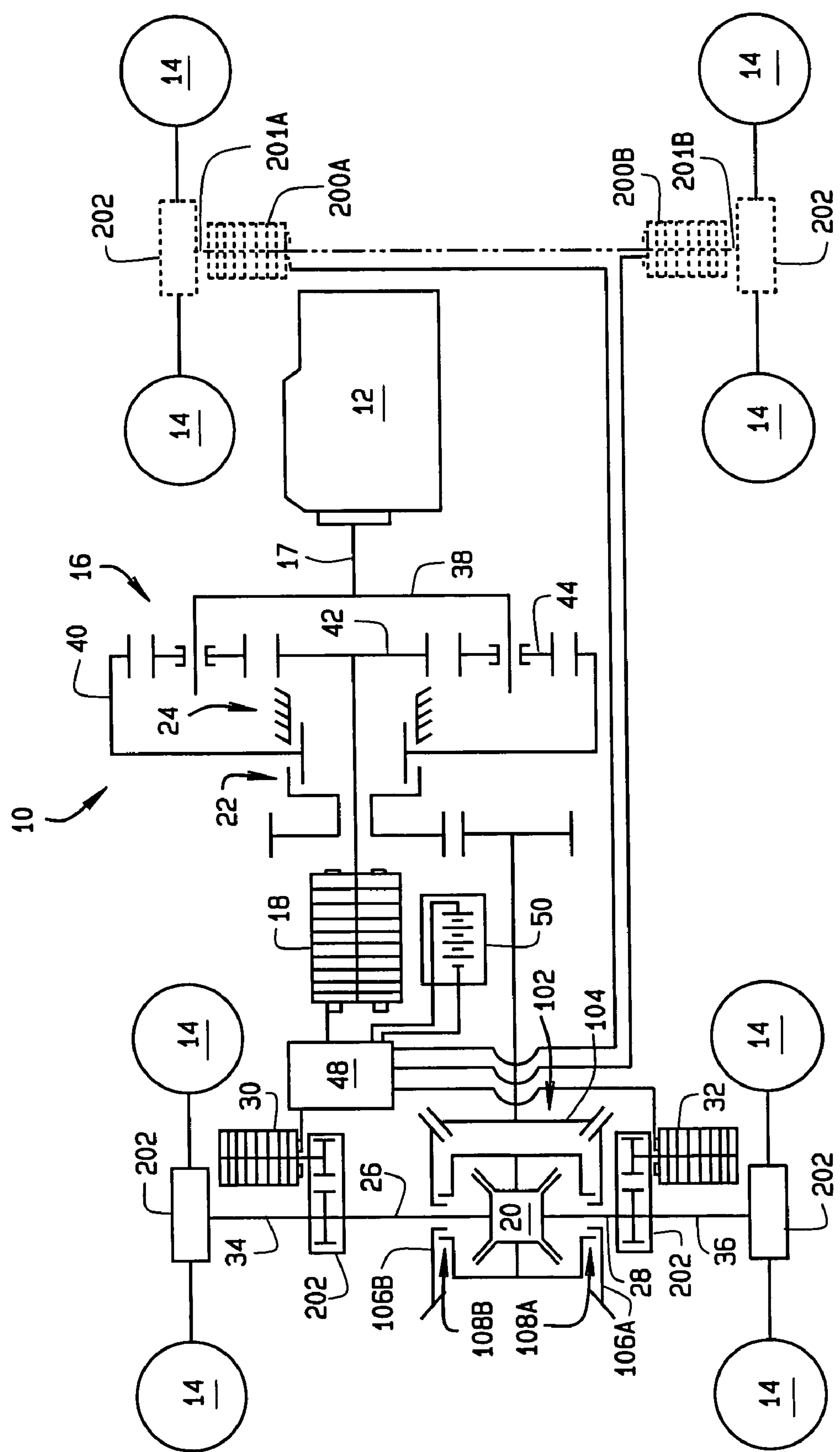
FIG. 12 is a schematic diagram of the fifth alternate embodiment of the drive system shown in FIG. 11, further including speed reduction units.

Further variations on the alternate embodiment of the drive system 10 shown in FIG. 9 are illustrated in FIGS. 10, 11, and 12 where two or more of the driven wheels 14 (i.e. front wheels, rear wheels, or all four driven wheels 14) are coupled to the drive system 10 through one or more associated conventional speed reduction devices 202. The conventional speed reduction device 202 can be as simple as a pinion gear 204 meshing with a bull gear 206, or a planetary gear train that contains a sun gear 204A or 204B, a ring gear 205A or 205B, and a set of planets along with a carrier 206A or 206B. The pinion gear 204 or sun gear 204A, 204B is connected to the associated secondary motor 30, 32, 200A or 200B, and bull gear 206, ring gear 206A, or planet carrier 206B is connected to the associated wheel output shafts 34, 36, 201A or 201B.

Figure 13:
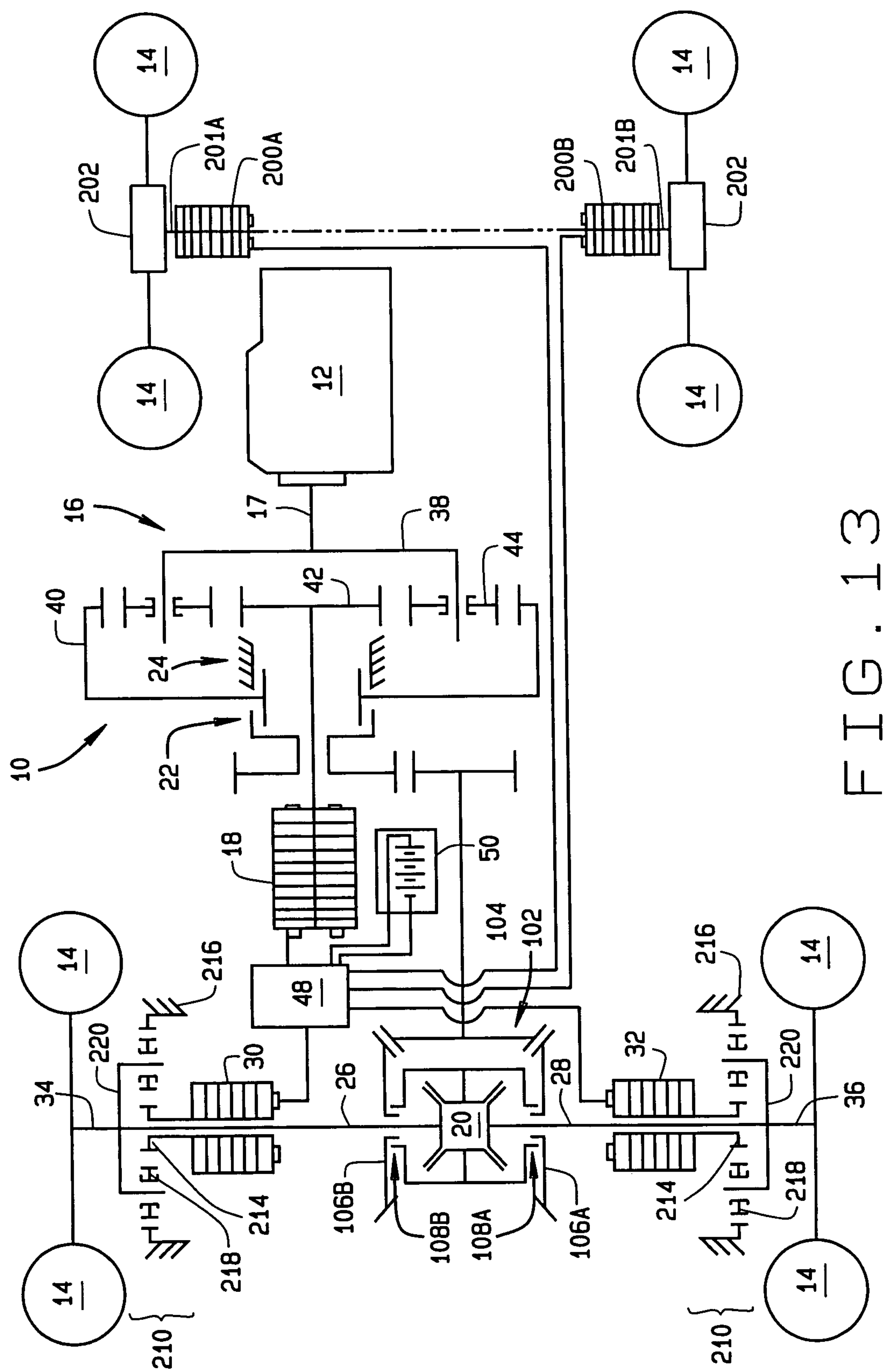
FIG. 13 is a schematic diagram of a sixth alternate embodiment of the drive system of the present invention.

An additional alternate embodiment of the drive system 10 shown in FIG. 13 illustrates the intermediate output shafts 26 and 28 from the mechanical differential gearbox 20 coupled directly to the associated wheel output shafts 34 and 36. The secondary motors 30 and 32 are coupled to the respective wheel output shafts 34 and 36 through conventional speed reduction units 210. Each speed reduction unit 210 consists of a planetary gear set 212 each having at least a sun gear 214, a ring gear 216, a planetary gear 218 and a planet carrier 220. At least one of the planetary members in the planetary gear set 212 is grounded, and at least one of the remaining members in the planetary gear set 212 is coupled to the an associated secondary motor 30 or 32.

Figure 14:
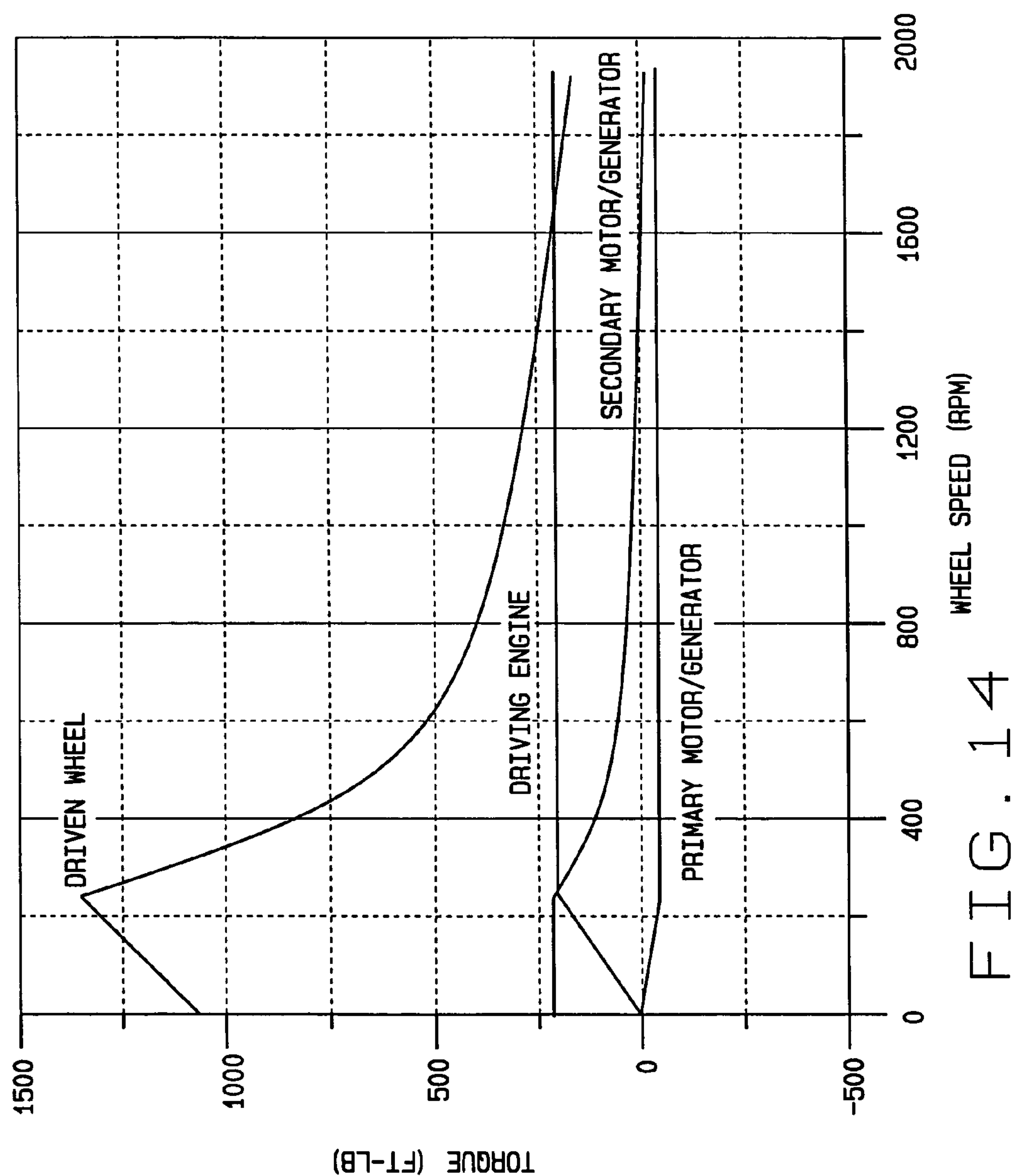
FIG. 14 is a graphical representation of engine, motor, and generator torque versus wheel speed for the embodiments of FIGS. 12 and 13 under uniform traction conditions.
Figure 15:
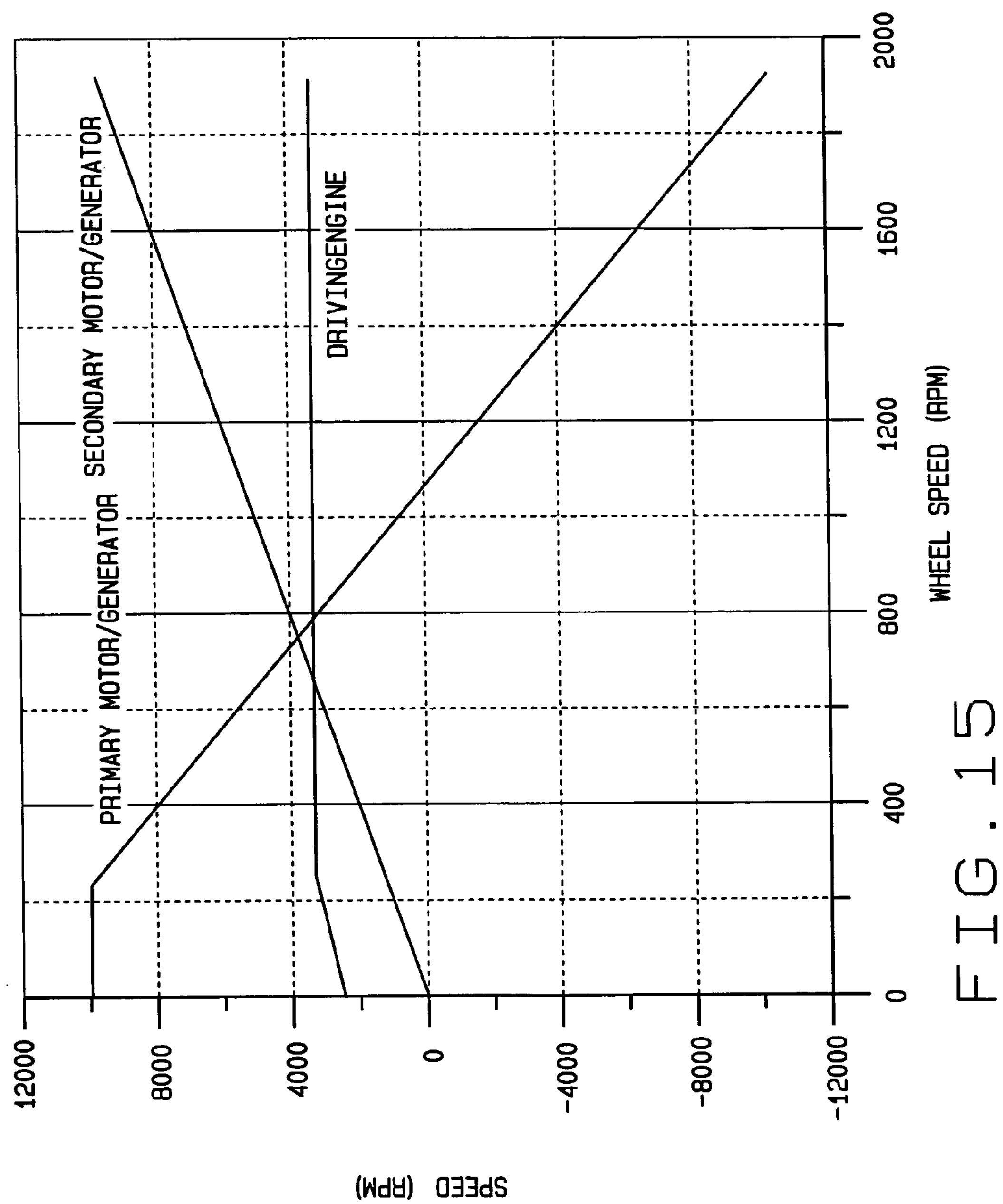
FIG. 15 is a graphical representation of engine, motor, and generator speed versus wheel speed for the embodiments of FIGS. 12 and 13 under uniform traction conditions.
Figure 16:
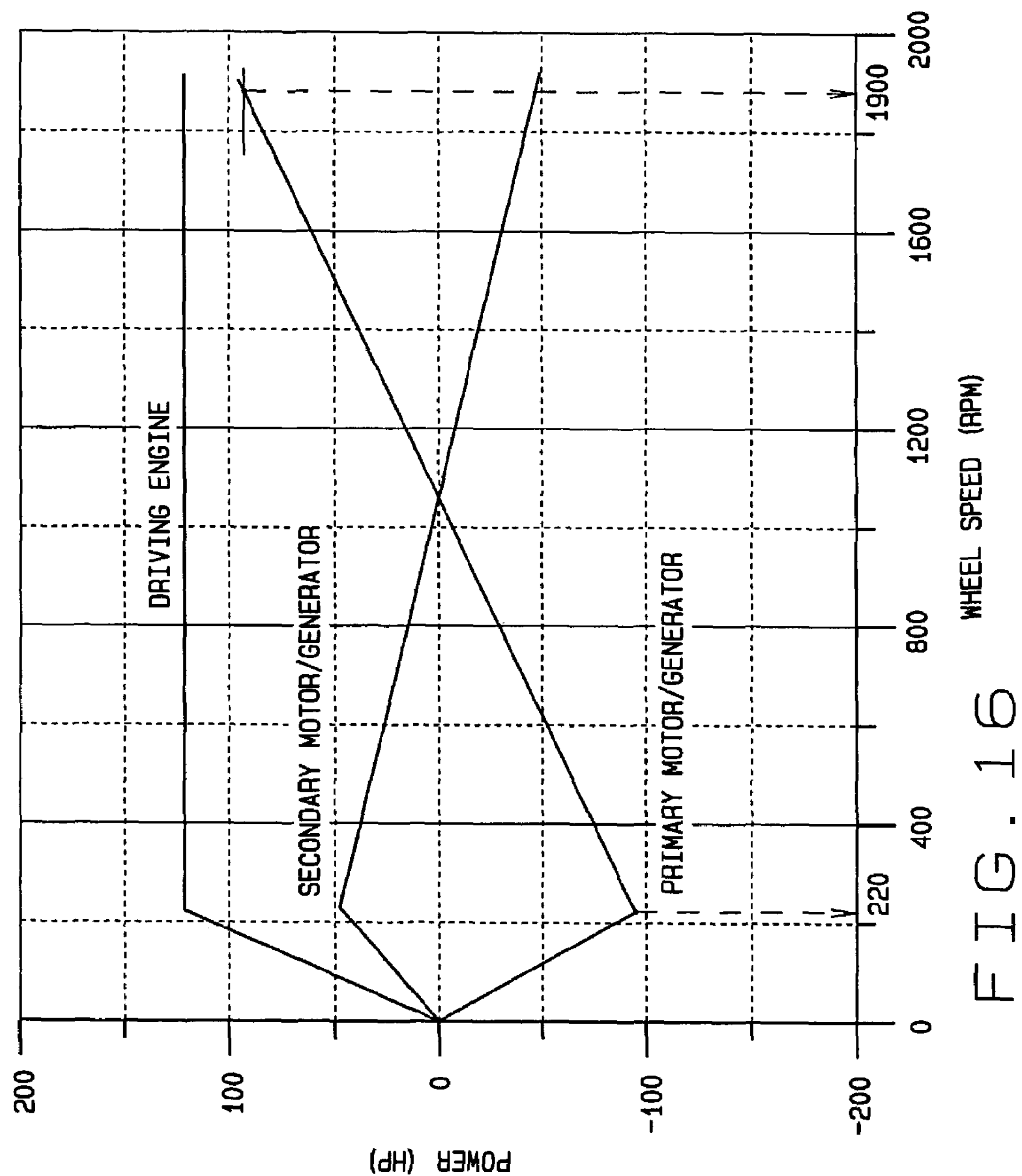
FIG. 16 is a graphical representation of engine, motor, and generator power versus wheel speed for the preferred embodiments of FIGS. 12 and 13 under uniform traction conditions.

Graphical representations of engine and motor torque, speed, and power as a function of vehicle wheel speed for the variations of the drive system 10 depicted in FIGS. 11–13 are shown in FIG. 14 through FIG. 16.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A vehicle drive system for a vehicle having a driving engine with an output shaft and at least one set of driven wheels, comprising:

a planetary gear train coupled to the driving engine output shaft;

a primary electric machine coupled to said planetary gear train;

a mechanical differential gearbox coupled between said planetary gear train and each of said driven wheels in said at least one set of driven wheels;

at least a pair of secondary electric machines, each of said secondary electric machines coupled to one of said driven wheels in said at least one set of driven wheels;

an electronic controller interposed between said primary electric machine and each of said secondary electric machines, said electronic controller configured to selectively route power between said primary electric machine and at least one of said secondary electric machines to provide mechanical power at a driven wheel associated with said at least one secondary electric machine in a first operational state, and to selectively route power between said primary electric machine and at least one of said secondary electric machines to drive said primary electric machine in a second operational state;

a mechanical clutch interposed between said mechanical differential gearbox and said planetary gear train;

a braking system operatively coupled to said planetary gear train;

wherein said mechanical clutch and braking system cooperate to regulate a flow of mechanical power to said mechanical differential gearbox;

wherein said planetary gear train and said mechanical differential gearbox define a mechanical power path from said driving engine to said driven wheels; and wherein said planetary gear train, said primary electric machine, and each of said secondary electric machines define an electrical power path from said driving engine to said driven wheels.

2. The vehicle drive system of claim 1 further including an energy storage system coupled to said electronic controller; and wherein said electronic controller regulates a flow of energy to and from said energy storage system.

3. The vehicle drive system of claim 1 further including a direction selection device operatively coupled between said planetary gear train and said mechanical differential gearbox.

4. The vehicle drive system of claim 1 wherein said vehicle includes a first set of driven wheels and a second set of driven wheels, said mechanical differential gearbox coupled between said planetary gear train and each of said driven wheels in said first set of driven wheels; and each of said secondary electric motors coupled to one of said driven wheels in said second set of driven wheels.

5. The vehicle drive system of claim 4 further including a second pair of secondary electric machines, each of said second pair of secondary electric machines coupled to one of said driven wheels in said first set of driven wheels.

6. The vehicle drive system of claim 1 further including a plurality of speed reduction units, each of said plurality of speed reduction units coupled between said mechanical differential gearbox and one of said driven wheels in said at least one set of driven wheels.

7. The vehicle drive system of claim 6 wherein each of said plurality of speed reduction units is further coupled to one of said pair of secondary electric machines, said speed reduction unit including:

a planetary gear set having a sun gear, a ring gear, a planetary gear, and a planet carrier; and wherein at least one component of said planetary gear set is grounded.

8. The vehicle drive system of claim 1 wherein said electronic controller is further configured to balance an output torque of said primary electric machine to an input torque received from said driving engine, responsive to said driving engine operating below a predetermined power level.

9. The vehicle drive system of claim 1 wherein said electronic controller is further configured to increase an output torque of said primary electric machine responsive to said driving engine operating at a predetermined power level and said driven wheels rotating below a predetermined speed.

10. The vehicle drive system of claim 1 wherein said electronic controller is further configured responsive to said driving engine operating at a predetermined power level and said driven wheels rotating above a predetermined speed to (1) operate said primary electric machine in a reverse direction at an increasing rotational speed; and (2) to extract electrical power from at least one of said secondary electric machines responsive to said driving engine operating at a predetermined power level and said driven wheels rotating above a predetermined speed.

11. A method for delivering power from a driving engine to the driven wheels of a vehicle through a vehicle drive system having a planetary gear train coupled to a driving engine output shaft, a primary electric machine coupled to said planetary gear train, a mechanical differential gearbox coupled between said planetary gear train and each of said driven wheels in said at least one set of driven wheels, and at least a pair of secondary electric machines, each of said secondary electric machines coupled to one of said driven wheels in said at least one set of driven wheels, comprising:

selectively utilizing a portion of mechanical power received from said driving engine to drive said set of driven wheels;

selectively converting a portion of mechanical power received from said driving engine into electrical power;

routing said electrical power between said primary motor and at least one of said secondary electric machines;

utilizing said electric power to provide mechanical power at said driven wheel associated with said at least one secondary electric machine in a first operational state, and utilizing electrical power generated by said at least one secondary electric machine to drive said primary electric machine in a second operational state.

12. The method of claim 11 wherein the step of converting a portion of mechanical power received from said driving engine into electrical power includes balancing an output torque of said primary electric machine to an input torque received from said driving engine responsive to said driving engine operating below a predetermined power level.

13. The method of claim 12 wherein the step of converting a portion of mechanical power received from said driving engine into electrical power includes increasing an output torque of said primary electric machine responsive to said driving engine operating at a predetermined power level and said driven wheels rotating below a predetermined speed.

14. The method of claim 12 wherein the step of converting a portion of mechanical power received from said driving engine into electrical power includes operating said primary electric machine in a reverse direction at an increasing rotational speed and extracting electrical power from at least one of said secondary electric machines responsive to said driving engine operating at a predetermined power level and said driven wheels rotating above a predetermined speed.

15. The method of claim 11 further including the steps of:

detecting slippage between a road surface and a driven wheel in said at least one set of driven wheels; and redirecting driving power from said slipping driven wheel to a remaining driven wheel in said one set of driven wheels.

* * * * *